United States Patent
Zheng et al.

(10) Patent No.: US 12,393,392 B2
(45) Date of Patent: Aug. 19, 2025

(54) METHODS AND SYSTEMS TO MONITOR REMOTE-RENDERING OF TRANSMITTED CONTENT

(71) Applicant: Orange, Issy-les-Moulineaux (FR)

(72) Inventors: Tao Zheng, Beijing (CN); Xiaoyu Richard Wang, Beijing (CN); Xin Wang, Beijing (CN)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 18/253,355

(22) PCT Filed: Nov. 23, 2021

(86) PCT No.: PCT/IB2021/000836
§ 371 (c)(1),
(2) Date: May 17, 2023

(87) PCT Pub. No.: WO2022/112846
PCT Pub. Date: Jun. 2, 2022

(65) Prior Publication Data
US 2024/0028288 A1    Jan. 25, 2024

(30) Foreign Application Priority Data
Nov. 24, 2020   (WO) ................ PCT/CN2020/131068

(51) Int. Cl.
*G06F 15/16*    (2006.01)
*G06F 3/14*     (2006.01)
(Continued)

(52) U.S. Cl.
CPC .......... *G06F 3/1462* (2013.01); *G06T 7/0002* (2013.01); *G06T 7/11* (2017.01); *G06V 10/44* (2022.01); *G06V 10/764* (2022.01)

(58) Field of Classification Search
None
See application file for complete search history.

(56) References Cited

U.S. PATENT DOCUMENTS

| 8,879,813 B1 | 11/2014 | Solanki et al. |
| 9,497,412 B1 | 11/2016 | Rosenberg |

(Continued)

FOREIGN PATENT DOCUMENTS

| CN | 104 581 140 B | 8/2016 |
| CN | 111 583 251 A | 8/2020 |

OTHER PUBLICATIONS

International Search Report and Written Opinion dated Mar. 29, 2022 for Application No. PCT/IB2021/000836.

(Continued)

*Primary Examiner* — Carl Adams
(74) *Attorney, Agent, or Firm* — Knobbe, Martens, Olson & Bear, LLP (57) ABSTRACT

Methods and systems are described for monitoring, at a source device, the rendering at a destination device of content received by the destination device from the source device. In one use case, a source device monitors the fidelity of screen-sharing by a remote device. At the destination device, a metric is generated characterizing the content rendered at the destination device. Using this metric, the similarity between the content rendered at the destination device and source content transmitted by the source device is estimated. An indication of the estimated similarity is then displayed on a display associated with the source device.

12 Claims, 6 Drawing Sheets

(51) Int. Cl.
  *G06T 7/00*    (2017.01)
  *G06T 7/11*    (2017.01)
  *G06V 10/44*   (2022.01)
  *G06V 10/764*  (2022.01)

(56) References Cited

U.S. PATENT DOCUMENTS

| | | | |
|---|---|---|---|
| 2010/0287128 A1* | 11/2010 | Baltatu | H04L 63/1425 709/224 |
| 2012/0269425 A1 | 10/2012 | Marchesotti et al. | |
| 2013/0151976 A1* | 6/2013 | Bhogal | G06F 3/0484 715/733 |
| 2013/0238684 A1* | 9/2013 | Patil | G06F 3/1462 709/203 |
| 2015/0156419 A1 | 6/2015 | Aggarwal et al. | |
| 2015/0193947 A1 | 7/2015 | Sharma et al. | |

OTHER PUBLICATIONS

Pech-Pacheco J Let Al: "Diatom antofocusing in brightfield microscopy: a comparative study", Proceedings/ 15th International Conference on Pattern Recognition: Barcelona, Spain, Sep. 3-7, 2000; [Proceedings of the International Conference on Pattern Recognition. (ICPR)], IEEE Computer Society, Los Alamitos, Calif. [U.A.], vol. 3, Sep. 3, 2000 (Sep. 3, 2000), pp. 314-317.

* cited by examiner

METHODS AND SYSTEMS TO MONITOR REMOTE-RENDERING OF TRANSMITTED CONTENT

RELATED APPLICATIONS

This application is the U.S. National Phase of Application No. PCT/IB2021/000836 entitled "METHODS AND SYSTEMS TO MONITOR REMOTE-RENDERING OF TRANSMITTED CONTENT" and filed Nov. 23, 2021, which claims the benefit of Patent Application No. PCT/CN2020/131068, filed Nov. 24, 2020, each of which is incorporated by reference in its entirety.

The present invention relates to the field of digital content sharing. More particularly, the invention relates to methods and systems to monitor remote rendering of transmitted content, notably content shared during a video conference (e-meeting).

Increasing numbers of video conferences (e-meetings) are being held both in a professional context and in a personal context. A common feature of such conferences is that one of the participants (the "presenter") may share their screen, slides, a file, etc. with the other participants (the "sharees"). Often, time is wasted during the video conference while the presenter asks the sharees to verify that they can see the shared content properly (on a display screen of the sharee's device).

The present invention has been made in the light of this issue.

Embodiments of the present invention provide systems and methods that provide a presenter with feedback, automatically, regarding how successfully they are sharing content with other devices (sharees).

The present invention provides a computer-implemented method to monitor, at a source device, the rendering at a destination device of content received by the destination device from the source device, the method comprising:
a) generating, at the destination device, a metric characterising the content rendered at the destination device;
b) estimating, using said metric, the similarity between the content rendered at the destination device and source content transmitted by the source device, and
c) displaying, on a display associated with said source device, an indication of the estimated similarity.

By virtue of the fact that the user of the source device (the presenter) obtains feedback automatically regarding how well the content-sharing function is performing, the monitoring method according to the invention avoids the need for explicit messaging or discussion between the users of the source and destination devices, thereby improving the efficiency of the video conference in which they participate. Furthermore, in the event that feedback obtained from the destination devices indicates that the similarity between the source content and the content as rendered at a particular destination device is below a determined threshold level, it may be envisaged to take some remedial action (e.g. change a compression algorithm applied to the content, change a transmission channel used for transmission of the content to the destination device, etc.).

The metric that is generated to characterise the content rendered at the destination device may characterise the quality of the rendered content, and this may be used to infer a degree of similarity between the content rendered at the destination device and the source content supplied by the source device, notably based on an assumption of a certain quality level for the source content.

In certain embodiments of the invention, the metric that is generated to characterise the content rendered at the destination device indicates what proportion of the source content is being rendered at the destination device. Thus, for instance, in the event that shared image content is incomplete at the destination device, e.g. due to transmission errors of bandwidth limitations of the channel over which the content is shared, a quality indicator may be generated indicating an estimate of the percentage of the source image that is displayed at the destination device. It may be assumed that the source image is complete, and so the estimate of similarity between the source image and the image rendered at the destination device may be generated by inference, proportionately to the percentage of the source image that is displayed at the destination device.

In certain of the latter embodiments of the invention, the metric characterising the quality of the content rendered at the destination device is generated by classifying respective regions of the displayed image into different classes dependent on whether or not this region reproduces image data of the source image, and assigning, to the quality metric, a value dependent on the number and/or area of the regions classified as reproducing image data of the source image. This classification may be performed using a trained machine learning system, for example using a one-class support vector machine.

In certain embodiments of the invention, the similarity between the content rendered at the destination device and the source content supplied by the source device is estimated by generating, for the content rendered at the destination device, a feature set describing one or more features of the rendered content, generating, for the source content, a feature set describing corresponding features of the source content, and comparing the feature set generated for the content rendered at the destination device with the feature set generated for the source content. In the event that the feature set contains values of more than one feature, the feature set may constitute a feature vector.

In certain of the latter embodiments of the invention, in the event that the source content comprises an image the feature set may consist of or include a feature quantifying the definition (sharpness/blurriness) of the rendered content, and the comparing of the feature set generated for the content rendered at the destination device with the feature set generated for the source content then may comprise comparing the definition of the content rendered at the destination device with the definition of the source content. In some cases, the comparing of the feature set generated for the content rendered at the destination device with the feature set generated for the source content may comprise dividing each of the source image and the image displayed at the destination device into a set of corresponding regions, and a region by region comparison of the definition of the image displayed at the destination device relative to the definition of the source image.

The above-described monitoring methods may be applied in a use case where the source device performs screen-sharing with a plurality of destination devices. An estimate of similarity, between an on-screen image displayed on each respective destination device and an image comprised in the source content, may be generated for each sharee device and an indication of each estimated similarity may be displayed on the presenter's screen. In this way, the presenter obtains feedback automatically regarding how well the screen-sharing function is performing, without any need to request the information explicitly from the sharees.

In some embodiments of the invention, the similarity estimate is classified into one of a plurality of classes and the feedback information displayed to the presenter may be a graphical indication of the assigned class, for example using a system where different colours are assigned to different classes. Not only does such an approach provide the presenter with the feedback information in a manner which is intuitively easy to understand, but also it may facilitate the establishment of rules regarding remedial action to be implemented when screen-sharing performance falls below certain thresholds (corresponding to the class boundaries).

The present invention further provides corresponding systems to monitor, at a source device, rendering at a destination device of content received by the destination device from the source device.

More particularly the invention provides a system to monitor, at a source device, rendering at a destination device of content received by the destination device from the source device, the system comprising:
- a metric-generation module configured to generate a metric characterising the content rendered at the destination device;
- a similarity-estimation module configured to estimate, using said metric, the similarity between the content rendered at the destination device and source content transmitted by the source device, and
- a feedback module configured to display, on a display associated with said source device, an indication of the estimated similarity.

The invention further provides a source computing device to monitor rendering at a destination device of content received by the destination device from the source computing device, the source computing device comprising:
- a display; and
- a feedback module configured:
  - to receive an estimate of the similarity between the content rendered at the destination device and source content transmitted by the source device, and
  - to display, on the display, an indication of the received similarity estimate.

Such a source computing device may further comprise a characterization module configured to generate a set of one or more features characterising the source content, wherein the feedback module is configured to display an indication of a received similarity estimate signifying the similarity between said set of one or more features characterising the source content and a feature set characterising a corresponding one or more features of corresponding content rendered at the destination device.

The invention yet further provides a computer program comprising instructions which, when the program is executed by a processor of a source computing device, cause the processor to monitor rendering at a destination device of content received by the destination device from the source computing device by:
- receiving an estimate of the similarity between the content rendered at the destination device and source content transmitted by the source computing device,
- generating, for display, an indication of the received similarity estimate, and
- outputting the generated similarity indication to a display.

The invention still further provides a computer-readable medium comprising instructions which, when executed by a processor of a source computing device, cause the processor to monitor rendering at a destination device of content received by the destination device from the source computing device by:
- receiving an estimate of the similarity between the content rendered at the destination device and source content transmitted by the source computing device,
- generating, for display, an indication of the received similarity estimate, and
- outputting the generated similarity indication to a display.

Further features and advantages of embodiments of the present invention will become apparent from the following description of said embodiments, which is given by way of illustration and not limitation, illustrated by the accompanying drawings, in which:

FIGS. 3A and 3B are block diagrams illustrating functional modules that may be provided in systems according to two embodiments of the invention, in which:

FIG. 3A illustrates an example in which an e-meeting system (server) comprises a module that implements a similarity-estimating function, and FIG. 3B illustrates an example in which a source device that shares content with one or more destination (sharee) devices comprises a module that implements a similarity-estimating function;

FIG. 6 is a diagram illustrating different images rendered at a destination device, wherein FIGS. 6(A), 6(B), 6(C) and 6(D) illustrate images which differ in terms of the amount of the source image that is reproduced;

FIG. 10 is a diagram illustrating different images rendered at a destination device, wherein FIGS. 10(A), 10(B), 10(C) and 10(D) illustrate images which differ in terms of the definition (sharpness) of the rendered image;

Various features and principles of embodiments of the present invention will be described below in the context of screen-sharing during a videoconference. However, it is to be understood that this is but one use case of the invention. The invention applies more generally to use cases in which digital content is transmitted from a source device to one or more destination devices and the source device monitors the rendering of the content at the destination device.

Figure 1:
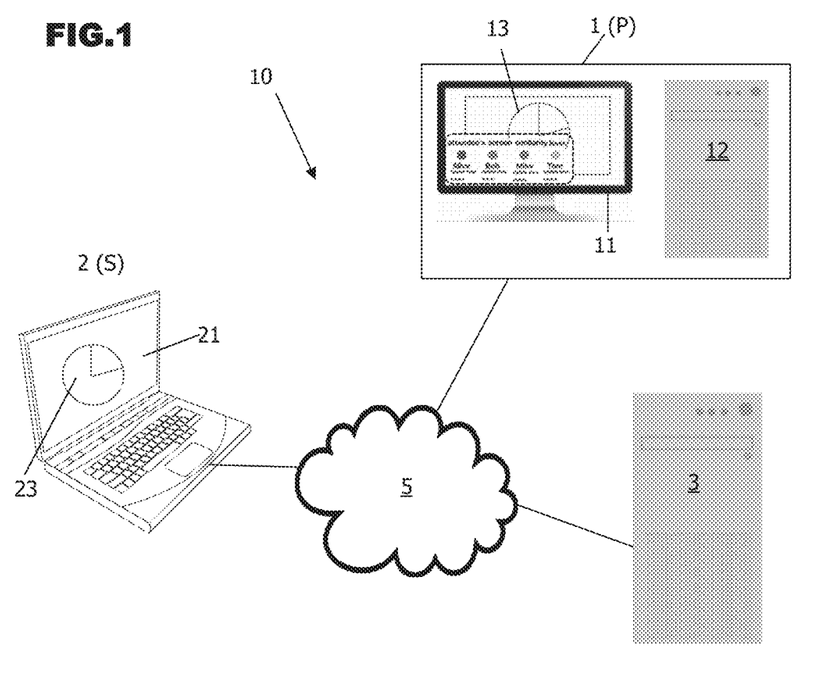
FIG. 1 is a diagram illustrating an example of a first embodiment of a system according to the present invention.

FIG. 1 illustrates an example of a system 10 in which the present invention may be implemented. According to this example the system 10 includes a computer system, 1, which is a source of digital content that is supplied to one or more other computer systems, 2, via a network 5, as well as a further computer system 3 which functions as an e-meeting system managing the set-up and running of a communication session between the computer systems 1 and 2. For instance, the e-meeting system 3 may process and maintain the connections between the participants in the e-meeting, and may keep track of the role currently being performed by each participant in the e-meeting (bearing in mind that the role of presenter often changes in a dynamic fashion during a video conference). In applications where it is acceptable to limit the number of participants, it may be acceptable to omit the e-meeting system 3 and arrange for the presenter device to process and maintain each connection with the sharees.

In the illustrated example, the computer system 1 corresponds to a desktop computer having a processing unit 12 and a display 11, the computer system 2 is a laptop having a display screen 21, and the computer system 3 is a server, but it is to be understood that the invention is not limited to this case. The computer systems 1 and 2 may be embodied on various different types of apparatus capable of assuring computing functions, including, but not limited to, desktop and laptop computers, tablets, mobile telephones, etc. In a similar way, the e-meeting system 3 may be embodied on one or more servers, including cloud servers. The communications network 5 that interconnects the computer systems 1, 2 and 3 may be any kind of wired or wireless network including a WAN, LAN, the Internet, etc.

The example illustrated in FIG. 1 relates to a use case in which a video conference (e-meeting) is conducted involving the computer systems 1 and 2 as participants, and the computer system 3 manages the video-conference. In this example, computer system 1 is a source device 1 acting as a presenter sharing an image 13 with the other participant(s) in the video conference, notably with computer system 2 which functions as a destination device (sharee). In this example the display screen 21 of the sharee 2 displays an image 23 based on the content received from the presenter 1.

Figure 2:
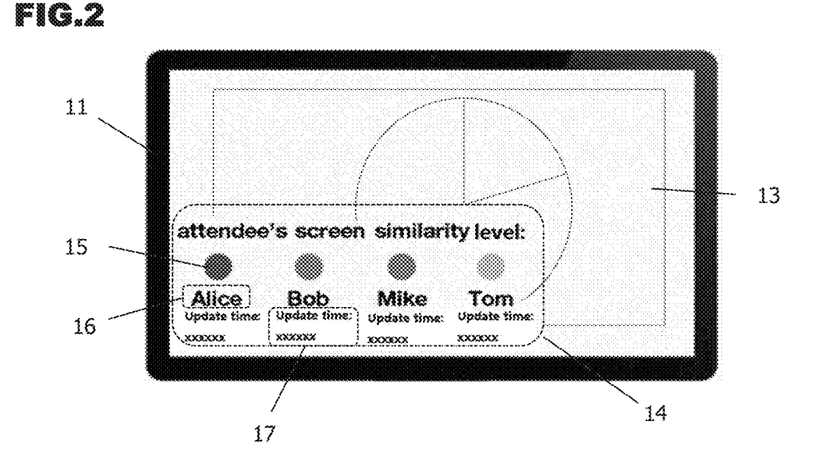
FIG. 2 is a diagram representing an example of a screen overlay that may be displayed on a display screen of a presenter sharing content with plural sharees in an embodiment of the present invention.

According to the systems and methods of the present invention, the source device automatically obtains feedback regarding the similarity between the source content and the content as rendered on the destination device. FIG. 2 illustrates an example of the form this feedback may take, notably in an example of the system illustrated in FIG. 1.

In the example illustrated in FIG. 2, feedback 14 is provided on the display 11 of the source device 1 to inform the user of the source device of the similarity level between the source content and what is being rendered on the displays of the attendees (sharees). The example illustrated in FIG. 2 assumes that there are four sharees—Alice, Bob Mike and Tom—who have devices displaying respective images 23 based on the source image 13. In this example, each similarity is classified into one of a plurality of classes, depending upon the degree of similarity between the source image 13 and the respective rendered image 23, a colour code is assigned to each class and the feedback 14 includes a displayed patch 15 of the colour relevant for each sharee. The colour codes may, for example, correspond to the lights on a traffic signal, with green indicating a satisfactory level of similarity between the source image and the image rendered on the destination device, red indicating an unsatisfactory level of similarity, and orange indicating an intermediate level of similarity. Of course, a colour code using a larger number of colours than three may be used. In a similar way, the class of the similarity level may be indicated by a graphical indication other than colour. The display of a graphical element 15 indicating the similarity level in terms of an assigned class, rather than an absolute value, may make understanding of the similarity level more intuitive. If desired, the value of the similarity level can be displayed, instead of displaying an assigned class. Any convenient graphic may be used to represent the value of the similarity level (e.g. a bar whose height corresponds to the value of the similarity level, a shape which is filled to a degree proportionate to the value of the similarity level, etc.).

In the example illustrated in FIG. 2, the feedback 14 further includes an identifier 16 of the sharee whose display is displaying the image in question, the identifier being displayed in association with the relevant similarity level indicator 15 applicable to this sharee. In this example, the identifier 16 take the form of display of a character string representing the name of the relevant sharee but other indicators could, of course, be used (e.g. nicknames, identification codes, an address of the sharee device, etc.). In principle, the identifier 16 could be omitted in a simplified application where the presenter simply needs to know whether content-sharing is working well globally for all sharees.

In the example illustrated in FIG. 2, the feedback 14 further includes displayed time data 17, associated with the similarity level indicators 15, indicating how recently the associated similarity level has been determined (generated or updated). Display of this time data 17 is optional but it can be advantageous because it enables the presenter to evaluate the reliability of the displayed similarity levels (i.e. if a displayed similarity level was determined long ago then it may not be safe to assume that the sharee device is still rendering the shared content with the indicated level of similarity).

Figure 3A:
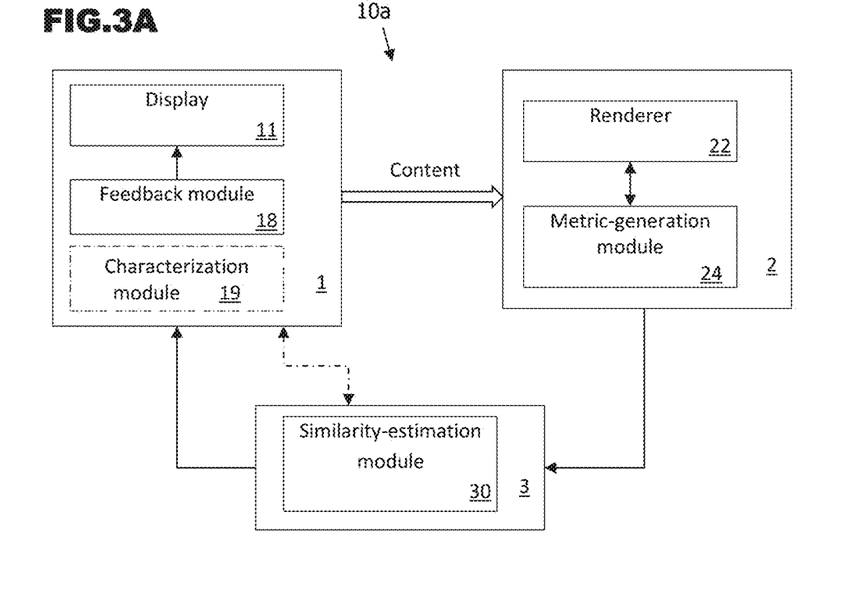
Figure 3B:
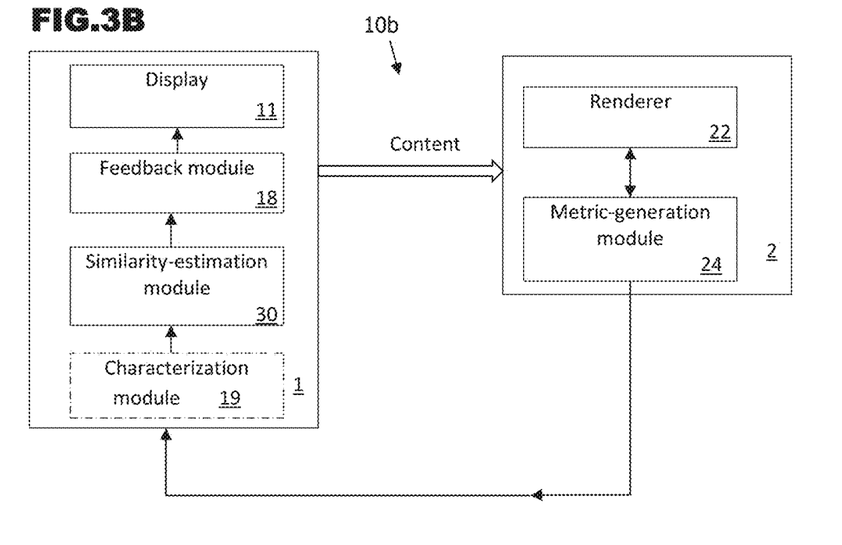

A system embodying the invention may be constructed using functional modules distributed between the computer systems 1, 2 and 3 illustrated in FIG. 1. FIG. 3A and FIG. 3B illustrate two configurations corresponding to different distributions of the functional modules between the computer systems, but it will be understood that these two configurations are not exhaustive.

In the configuration illustrated in FIG. 3A, the source device 1 includes, as well as a display 11, a feedback module 18 configured to generate the feedback 14 indicating the estimated similarity between the content being rendered at one or more sharee devices 2 and the source content that the source device 1 transmitted to the sharees. The source device 1 may also include a characterization module 19 configured to generate data characterizing the source content (for example, the characterization module 19 may be configured to generate a feature set as described below).

In the configuration illustrated in FIG. 3A, the destination (sharee) device 2 includes a renderer 22 configured to render the received content. The renderer 22 may comprise a graphics card (not shown) for producing an image 23 on a display 21 of the destination device 2. The destination device 2 also includes a metric-generation module 24 configured to generate a metric characterizing the content as rendered at the sharee device 2.

In the configuration illustrated in FIG. 3A, the computer system (server) 3 includes a similarity-estimation module 30 which estimates, based on the metric generated by the metric-generation module 24, the similarity between the source content transmitted by the source device 1 and the content rendered at the destination device 2. The similarity-estimation module 30 is configured to supply data indicative of the estimated similarity to the feedback module 18 so that the feedback module 18 can provide the user of the source device 1 with the feedback 14 regarding the estimated similarity between the content being rendered at the destination device 2 and the source content.

As indicated above, the distribution of functional modules between computer systems can be varied, notably depending on the manner in which similarity is estimated between the source content and the content rendered at the sharee device. Thus, for example, in the example illustrated in FIG. 3B the similarity-estimation module 30 is provided at the source device 1, not in a computer system 3 operating as an e-meeting system.

Although FIG. 3A and FIG. 3B illustrate the various functional modules of the system as a particular number of individual modules, it will be understood that these figures are functional block diagrams and, in practice, the relevant functions may be implemented using a greater or lesser number of modules (i.e. some functions may be amalgamated into a common module, and/or some functions may be broken down into sub-processes performed by separate modules). Moreover, in many embodiments of the invention the functional modules are implemented in software.

Figure 4:
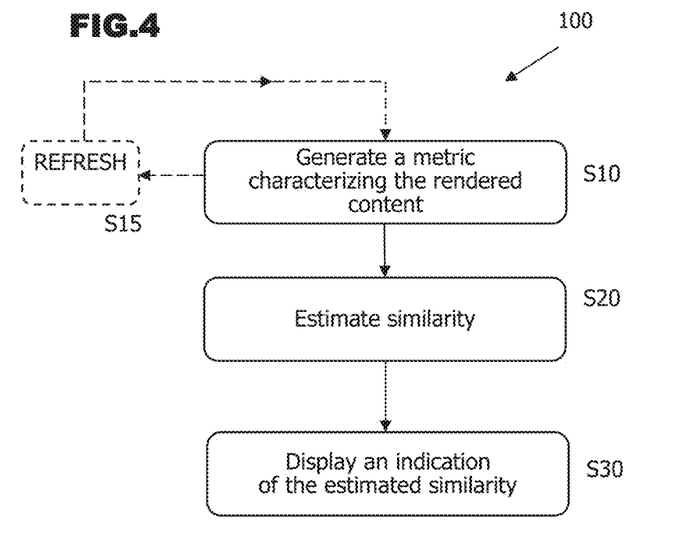
FIG. 4 is a flow diagram illustrating a monitoring method according to an embodiment of the invention.

FIG. 4 is a flow diagram representing an example of a method 100, according to an embodiment of the present invention, that monitors, at a source device, the rendering at a destination device of content received by the destination device from the source device.

In the example illustrated in FIG. 4, the method 100 includes a process S10 of generating, at the destination device (e.g. sharee device 2 in FIGS. 1, 3A and 3B), a metric characterising the content rendered at the destination device. There is further provided a process S20 of estimating, using the metric generated in process S10, the similarity between the content rendered at the destination device and source content transmitted by the source device (e.g. source device 1 in FIGS. 1, 3A and 3B). The method 100 further includes a process S30 of displaying, on a display associated with the source device, an indication of the estimated similarity.

If desired, the method 100 may include a refresh process S15 to trigger an update of the value of the metric characterizing the rendered content. For instance, the refresh process S15 may cause the metric to be updated after a predetermined time interval has elapsed. In such a case, processes S10 to S30 may be repeated, leading to a display, at the source device, of an indication of an updated value of the estimated similarity level. If desired, an indication of the time of the update may be generated and displayed at the source device. The update-time data may indicate the time of updating of the value of the metric characterising the content rendered at the destination device (in which case it can conveniently be generated at the destination device), but this is not the only possibility. As an example, the update-time data may indicate the time of estimation of the similarity between the similarity between the content rendered at the destination device and source content transmitted by the source device (in which case it can conveniently be generated by the similarity-estimation module 30). The update-time data may be consider to be a timestamp. This timestamp can reflect the network delay, situation and the rate of the sharee's display. For example, if a sharee's update time is old and the similarity level is low, that may mean the network speed is very slow, or even that there is an interruption in the network connection to the sharee.

Figure 5:
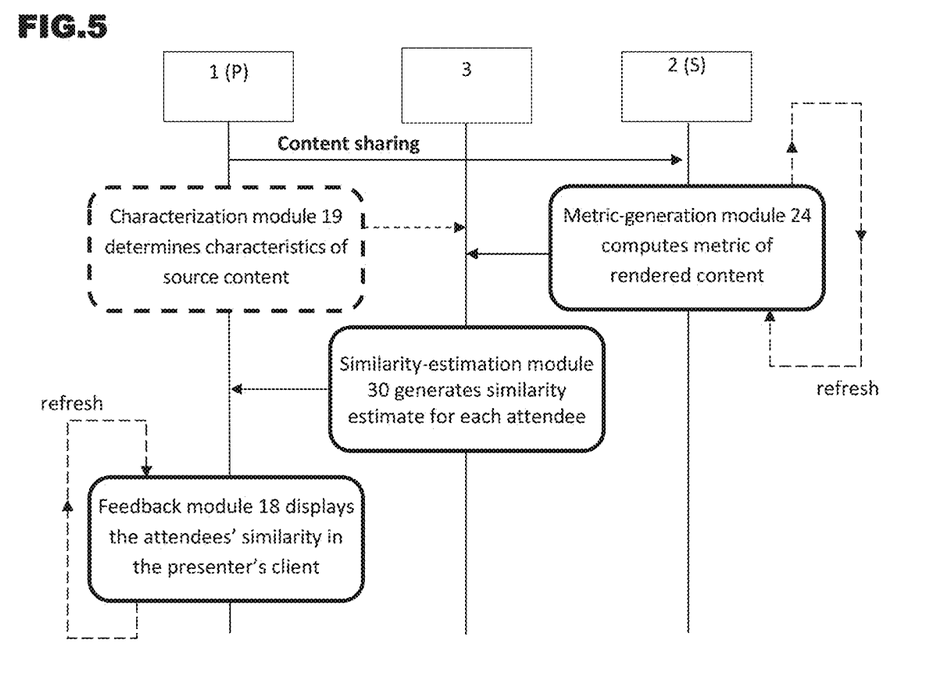
FIG. 5 is a diagram illustrating communication between devices in a system according to the embodiment illustrated in FIG. 3A participating in an implementation of the method of FIG. 4.

FIG. 5 illustrates processes that may be performed, and messages that may be exchanged, in an example of system 10a that implements the method 100 of FIG. 4.

In the example illustrated in FIG. 5, the source device 1 provides content to the destination device 2 via the e-meeting system 3. Destination device 2 renders the received content. The metric-generation module 24 of the destination device 2 computes a metric characterizing the rendered content and sends the e-meeting system 3 a message containing data indicative of the computed metric. A similarity-estimation module 30 in the e-meeting system 3 generates an estimate of the degree of similarity between the content rendered at the destination device 2 and the source content. As discussed below, this estimate may be determined by inference based on data received from the destination device alone, or by performance of a comparison between data received from the destination device 2 and data received from the source device 1 (e.g. characterization data produced by a characterization module 19). The similarity-estimation module 30 in the e-meeting system 3 sends to the source device 1 a message containing data indicative of the estimated similarity level. Feedback module 18 at the source device 1 generates a display of feedback 14 indicating the similarity between the source content and the content as rendered at the destination device 2. (This process may be refreshed as indicated by the dashed loops in the figure.)

In the present invention, different techniques may be used to estimate the similarity level between the content rendered at the destination device and source content transmitted by the source device. The similarity level may well be below 100% because of network transmission conditions (delay, limits on effective bandwidth, interrupts, etc.). The level of similarity tends to vary in a dynamic manner due to varying network conditions.

Figure 6:
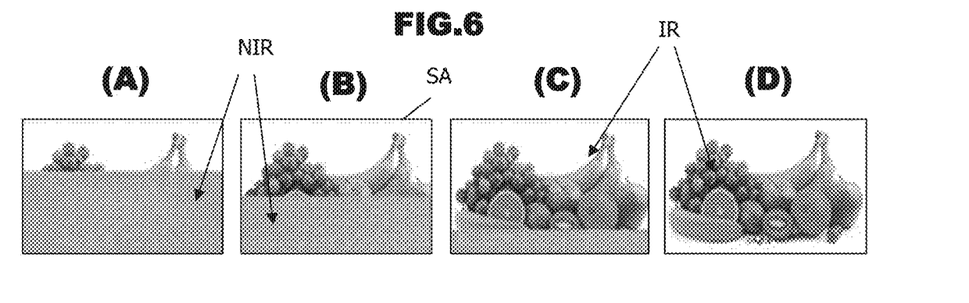
Figure 7:
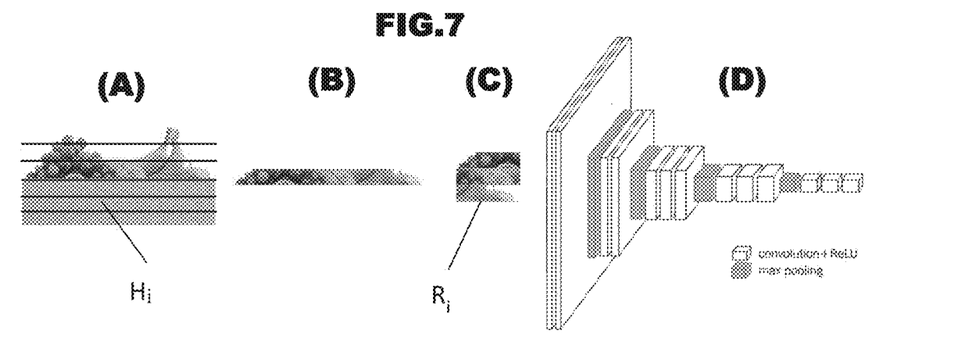
FIG. 7 is a diagram illustrating stages in a classification method that may be employed to characterize the quality of images of the kind illustrated in FIG. 6.
Figure 8:
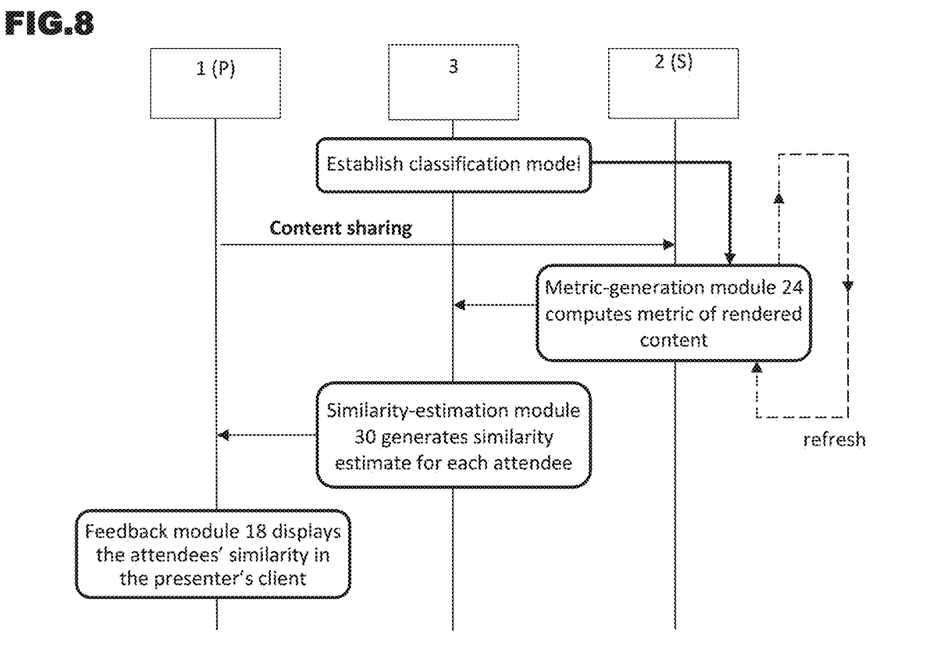
FIG. 8 is a diagram illustrating communication between entities participating in an example system embodying the invention that implements a classification technique such as that of FIG. 7.

A first set of techniques, that shall be designated type 1, assess the similarity between the content rendered at the destination device and source content by evaluating the quality of the content rendered at the destination device and inferring a similarity level based on the assumption that the source content has a reference quality level (e.g. the source content may be assumed to correspond to a high quality image). FIGS. 6-8 illustrate an example of a specific technique of type 1, in which the evaluation of the quality of the content rendered at a destination device comprises determining a proportion of the source content that is being rendered at the destination device. It will be understood that other metrics, appropriate to the nature of the content, may be used to characterize the quality of the rendered content.

Figure 9:
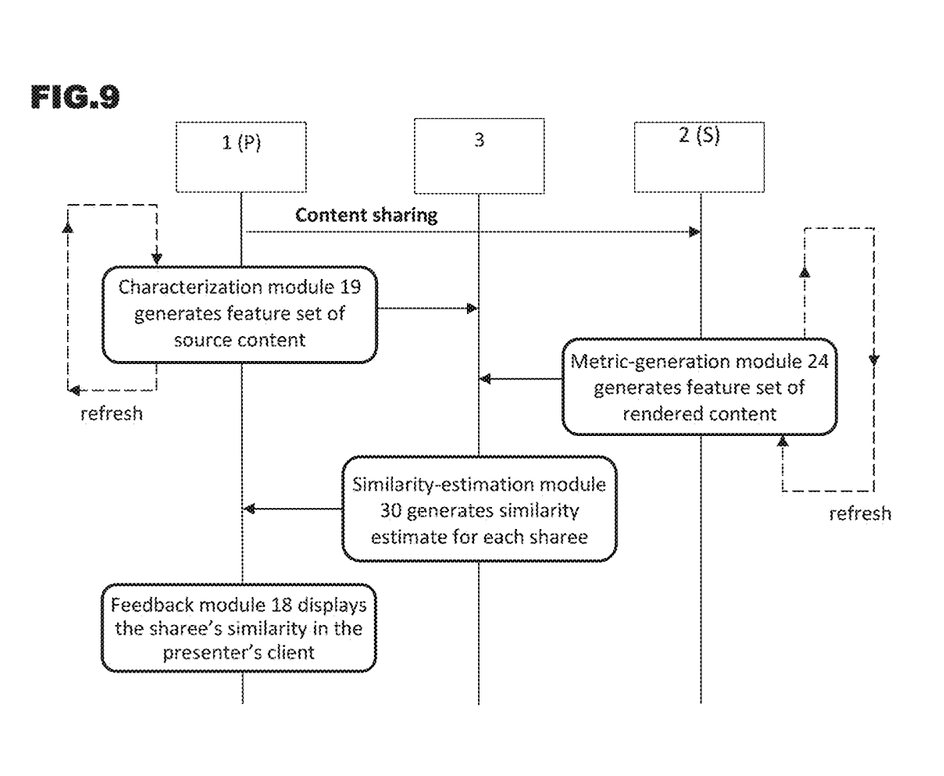
FIG. 9 illustrating communication between devices in a system according to a variant of the embodiment illustrated in FIG. 3A participating in an implementation of the method of FIG. 4 wherein features characterizing source content are compared with features characterizing content rendered at a destination device.
Figure 10:
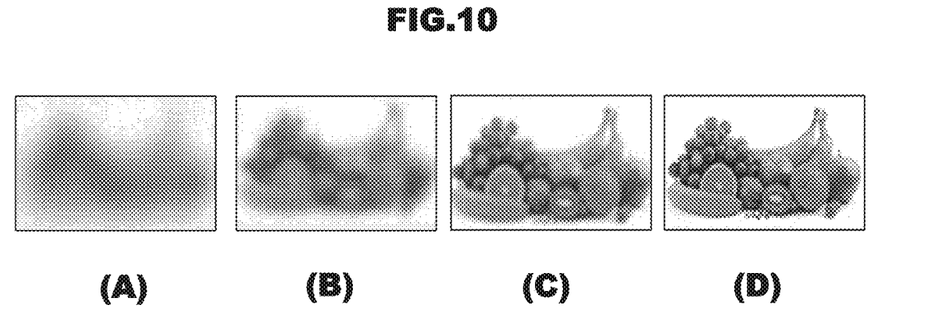
Figure 11:
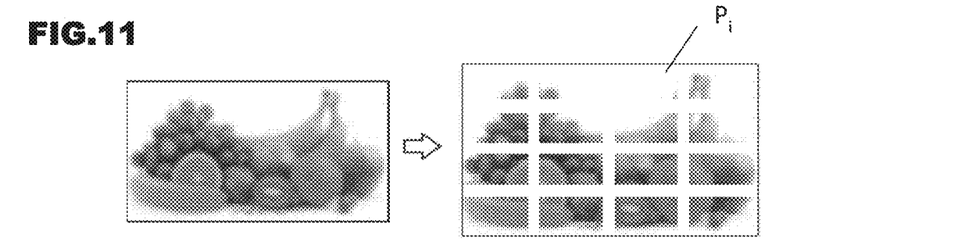
FIG. 11 is a diagram illustrating division of a rendered image into regions in an example method that compares the definition of an image rendered at a destination device with the definition of a source image.

A second set of techniques, that shall be designated type 2, assess the similarity between the content rendered at the destination device and source content by comparing one or more features of the rendered content with corresponding features of the source content; this may involve comparison between feature sets, feature vectors, etc. FIG. 9 illustrates processes that may be performed, and messages that may be exchanged, in an example of system 10b implementing a technique of type 2. FIGS. 10 and 11 illustrate an example of a specific technique of type 2, in which the features used to compare the content rendered at a destination device with the source content correspond to a degree of blurriness of an image.

Example of a Type 1 Technique

FIGS. 6-8 illustrate an example in which the content rendered at the destination device is, or includes, an image. In some cases, the image rendered at a destination device may be incomplete, for example due to communication problems in the network 5. FIGS. 6A, 6B, 6C and 6D illustrate four rendered images which differ in terms of the degree of completeness of the image. The image in FIG. 6A only reproduces the top portion of the source image. The images of FIG. 6B and FIG. 6C include progressively more of the image, and the image of FIG. 6D reproduces the whole of the source image. In this example, the metric-generation module 24 is configured to generate a metric which indicates the degree of completeness of the rendered image. The similarity-estimation module 30 estimates, a similarity level which is based on the degree of completeness of the rendered image as indicated by this metric, based on the assumption that the source image was complete. Indeed, in this example, there may be no need for a similarity-estimation module 30 and the metric-generation module 24 may send a message indicative of the completeness of the rendered image directly to the source device 1, as an indication of the degree of similarity between the rendered image and the source image.

Various approaches are possible for determining the degree of completeness of the content rendered at the destination device. FIGS. 6,7 and 8 illustrate one example in which regions in a displayed image are classified either as non-image regions, NIR, where parts of the source image fail to be reproduced, or as image regions, IR, where parts of the source image are successfully reproduced, as illustrated in FIG. 6. The non-image regions, NIR, tend to have consistent attributes, for example, they may appear as grey stripes on the display screen. Accordingly, during a training phase a classifier can be trained to recognize non-image regions and, during a production phase (or inference phase), the classifier may be applied (by or in association with the metric-generation module 24) to classify parts of the rendered image into non-image regions or image regions. The metric can then quantify the ratio of non-image regions (e.g. grey stripes) to the whole screen area where the source image should have been displayed.

Thus, for example, the area SA of the sharee's screen 21 where the source image should have been displayed may be divided into a number, n, of horizontal stripes $H_i$ all having the same dimensions, as illustrated in FIG. 7A (for example, the screen area may be divided into 10 horizontal stripes, $H_1$, $H_2$, ..., $H_{10}$). Each stripe can be rearranged into small-sized data R, such as a rectangle, as illustrated in FIG. 7B and FIG. 7C. As illustrated in FIG. 7D, the data may then be input into a set of convolutional neural networks (CNNs), to further reduce the picture's size while also preserving the characters in the image. This small-sized data R, can then be processed to decide whether the stripe in question is a non-image region (e.g. grey stripe) or not.

An anomaly detection method may be used to determine whether or not the small-sized data Ri corresponds to a grey stripe—in this case, the grey stripe is treated as the normal case, i.e. not an anomaly. In this example a kind of One Class Classification (https://en.wikipedia.org/wiki/One-class_classification) is used for this purpose, bearing in mind that there is only one "normal" case, and it is not sought to predict all anomaly cases. As an example of one kind of One Class Classification, in one embodiment the method was implemented using a One-Class Support Vector Machine (OCSVM). In OCSVM, the goal of training is to find a boundary of the normal class through training using examples of the normal data. Inside the boundary are the normal cases and outside the boundary are the abnormal cases. In some successful experiments, the OCSVM was implemented using Scikit Learn+TensorFlow frameworks.

Implementation of the OCSVM involved a training phase that was performed offline, using training data, in order to develop a model embodying the classification rules. The model was then deployed on the destination device 2 so that, during the inference (production) phase, stripes in the rendered image could be classified as non-image regions or image regions. More particularly, the rearranged data Ri was input into a set of convolutional neural networks (CNNs) embodying the model, as illustrated in FIG. 7D. The output from the set of convolutional neural networks indicates whether or not this stripe $H_i$ from the rendered image corresponds to a grey stripe (non-image region). After each stripe is processed, the ratio of the number of non-image regions identified by the classification process relative to the total number n of stripes may be used as the metric characterizing the quality of the rendered image and, hence, the degree of similarity between the rendered image and the source image. The estimated similarity value may itself be classified into classes representing different similarity levels, for example: in the event that the percentage of the screen area SA that corresponds to grey stripes is greater than 25% the similarity level may be defined as "minimum", in the event that the percentage is ≤25% but more than 15% the similarity level may be defined as "medium-", in the event that the percentage is ≤15% but more than 5% the similarity level may be defined as "medium+", and in the event that the percentage is ≤5% the similarity level may be defined as "maximum".

FIG. 8 represents an example of a process flow implementing the technique described above with reference to FIGS. 6 and 7.

In the example illustrated in FIG. 8, the classification model is established during a training phase performed by the e-meeting system 3. The classification model is then supplied by the e-meeting system to the destination device 2. The metric-generation module 24 divides the screen area SA into stripes, processes them using a set of CNNs, identifies them with the model using the OCSVM method, and computes the ratio of non-image regions to the whole of the relevant screen area SA. The computation may be refreshed and a timer may be provided to define the refresh interval. After the time is up, metric-generation module 24 repeats the process, sends the results to the similarity-estimation module 30 in the e-meeting system 3 and resets the timer when the screen content is changed. The information sent from metric-generation module 24 to the similarity-estimation module 30 in the e-meeting system 3 may include not only the ratio of the non-image regions to the screen area SA, but also a sharee ID and the current timestamp.

The similarity-estimation module 30 in the e-meeting system 3 estimates a similarity level in respect of the image rendered by sharee 2, based on the ratio of the non-image regions to the screen area SA. The similarity-estimation module 30 may also assign a similarity-level class (e.g. "minimum", "medium-", etc.) based on the similarity estimate. The similarity-estimation module 30 sends the similarity estimate (and/or similarity-level class) to the source device 1. The information sent from the similarity-estimation module 30 to the source device may include not only the similarity information, but also a sharee ID and a timestamp (which may be the same as the sharee ID and timestamp received from the sharee device 2). The feedback module 18 in the source device 1 generates and displays an indication of the similarity level, e.g. in the form of the feedback 14 described above.

Examples of Type 2 Techniques

FIG. 9 illustrates processes that may be performed, and messages that may be exchanged, in a variant example of system 10a that implements a type 2 technique. In this variant, the source device 1 includes a characterization module 19. In the example illustrated in FIG. 9, features characterizing source content are compared with features characterizing content rendered at a destination device in order to determine the estimate of similarity between the source content and the rendered content.

In the example illustrated in FIG. 9, the source device 1 provides content to the destination device 2 via the e-meeting system 3. Destination device 2 renders the received content. The metric-generation module 24 of the destination device 2 determines respective values of one or more features that characterize the rendered content and sends the e-meeting system 3 a message containing data indicative of the computed feature set. The characterization module 19 of the source device 1 determines respective values of one or more corresponding features that characterize the source content and sends the e-meeting system 3 a message containing data indicative of the computed feature set. In other words, the feature sets for the source content and rendered content contain values for the same set of attributes. A similarity-estimation module 30 in the e-meeting system 3 generates an estimate of the degree of similarity between the content rendered at the destination device 2 and the source content by comparing the feature set provided by the source device and the feature set provided by the destination device 2.

The similarity-estimation module 30 in the e-meeting system 3 sends to the source device 1 a message containing data indicative of the estimated similarity level. Feedback module 18 at the source device 1 generates a display of feedback 14 indicating the similarity between the source content and the content as rendered at the destination device 2. (This process may be refreshed as indicated by the dashed loops in the figure.)

Figure 12:
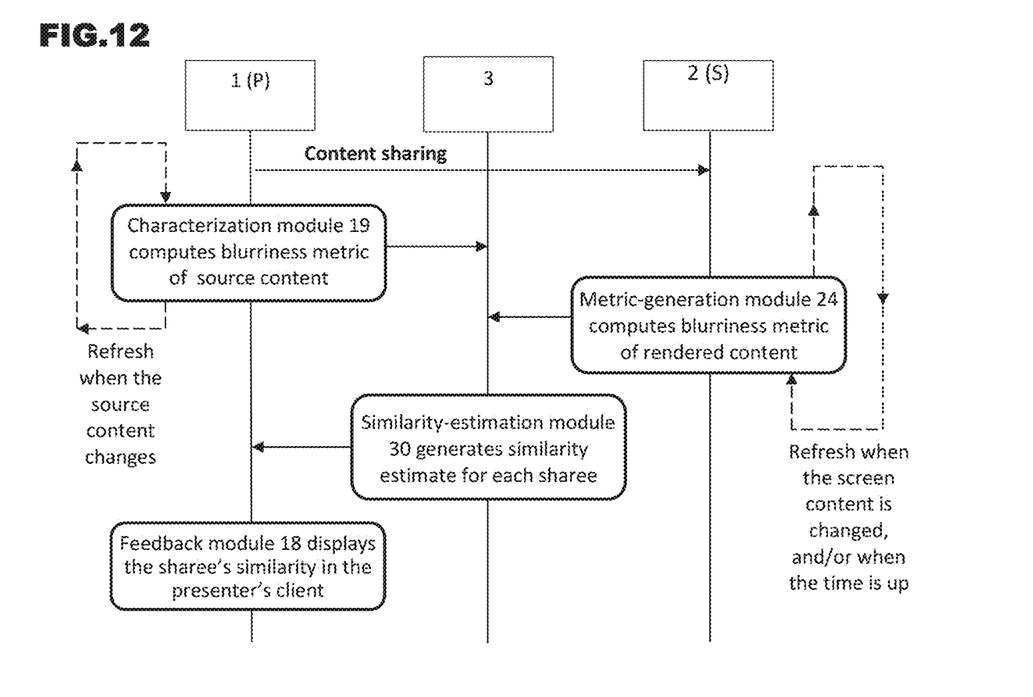
FIG. 12 is a diagram illustrating communication between entities participating in an example system embodying the invention wherein blurriness metrics characterizing source content are compared with blurriness metrics characterizing content rendered at a destination device.

FIGS. 10-12 illustrate a particular approach for implementing an example of a type 2 technique. In the example illustrated in FIGS. 10-12 the content rendered at the destination device 2 is, or includes, an image.

In some cases, the image rendered at a destination device may be blurry to a greater or lesser extent. FIGS. 10A, 10B, 10C and 10D illustrate four rendered images which differ in terms of the degree of blurriness of the image. The image in FIG. 10A corresponds to an extremely blurry rendering of the source image. The images of FIG. 10B and FIG. 10C correspond to renderings of the source image that become progressively sharper (less blurry), and the image of FIG. 10D substantially reproduces the source image (i.e. it is approximately as sharp as the source image). In this example, the metric-generation module 24 is configured to generate a metric which characterizes the degree of blurriness of the rendered image. The similarity-estimation module 30 estimates a similarity level which is based on a comparison between the degree of blurriness of the image rendered at the destination device 2 with the degree of blurriness of the source image. The similarity-estimation module 30 receives information regarding the degree of blurriness of the source image from a characterization module 19 which may be provided in the source device 1.

Any convenient technique may be used to quantify (or otherwise characterize) the degree of blurriness of the image rendered at the sharee's device 2. For instance, for detecting the blur, a method may be employed based on a modified Laplacian technique described by Pech-Pacheco et al. in the paper "Diatom autofocusing in brightfield microscopy: a comparative study" (Proceedings of the 15th International Conference on Pattern Recognition, 2000, Volume 3, IEEE). However, in view of the fact that some regions of the source image may contain a degree of blurriness, more accurate results may be obtained by assessing the blurriness of the image region by region, rather than for the image as a whole. Thus, as illustrated in FIG. 11, the image may be divided into a number p of regions Pi having the same dimensions (16 rectangles in the illustrated example).

A characterisation module 19 at the source device 1 may divide up the source image into regions Pi and compute a blurriness metric for each of these regions. The results are sent to the similarity-estimation module 30. In a similar way, the metric-generation module 24 computes a corresponding blurriness metric on the sharee side for corresponding regions Pi in the rendered image and sends the results to the similarity-estimation module 30. The similarity-estimation module 30 compares the blurriness metrics of the source image and rendered image to one another in order to decide the level of similarity of the image rendered on the sharee's screen to the source image. Different approaches may be used to evaluate the similarity level, for example, based on the average values for the regions Pi, numbers of regions Pi for which blurriness exceeds a threshold value, etc.

In one example, the average difference between the blurriness of the regions Pi in the source image and those in the rendered image is used to estimate the similarity level between the source image and rendered image. Considering the blurriness values for the source image as a 4×4 matrix, each element of which indicates a blurriness value for a corresponding region in the source image, an example of the blurriness metric matrix for the source image could be, as follows:

$$\begin{pmatrix} 102 & 120 & 98 & 87 \\ 100 & 110 & 130 & 121 \\ 201 & 105 & 100 & 85 \\ 67 & 86 & 102 & 200 \end{pmatrix}$$

A blurriness matrix for the corresponding image as rendered on a sharee's display could then be, as follows (noting that lower values correspond to a more blurry image):

$$\begin{pmatrix} 83 & 102 & 88 & 65 \\ 85 & 95 & 105 & 105 \\ 165 & 95 & 92 & 80 \\ 61 & 63 & 88 & 170 \end{pmatrix}$$

The average of the differences between the blurriness values of corresponding regions in the source image and rendered image is 16.275 in this example. A large value of this average indicates that the rendered image is fairly dissimilar from the source image in terms of blurriness. A small value for this average indicates that the rendered image has a similar degree of blurriness to the source image. Accordingly, the similarity-estimation module 30 may assign a similarity value based on the average of the differences between the blurriness values of corresponding regions in the source image and rendered image.

The estimated similarity value may itself be classified into classes representing different similarity levels, for example: in the event that the average of the differences between the blurriness values of corresponding regions in the source image and rendered image is greater than 30 the similarity level may be defined as "minimum", in the event that the average is 30 but more than 15 the similarity level may be defined as "medium-", in the event that the average is 15 but more than 5 the similarity level may be defined as "medium+", and in the event that the average is the similarity level may be defined as "maximum". So, the similarity level in the example above would be classified as "medium-".

FIG. 12 represents an example of a process flow implementing the technique described above with reference to FIGS. 10 and 11.

In the example illustrated in FIG. 12, the metric-generation module 24 divides the relevant screen area into parts Pi, computes the blurriness metric of each part Pi according to the above-described method and sends all the blurriness metric values to the similarity-estimation module 30 in the e-meeting system 3. In a similar way, the characterization module 19 in the source device 1 divides the relevant screen area into parts Pi, computes the blurriness metric of each part Pi according to the above-described method and sends all the blurriness metric values to the similarity-estimation module 30 in the e-meeting system 3. The computations performed by the characterization module 19 of the source device 1 may be refreshed when the source content changes, and the results sent to the similarity-estimation module 30. On the sharee's side a timer may be set and, after the time is up, metric-generation module 24 repeats the blurriness-computation process, sends the results to the similarity-estimation module 30 in the e-meeting system 3 and resets the timer once the screen content is changed. The information sent from metric-generation module 24 to the similarity-estimation module 30 in the e-meeting system 3 may include not only the blurriness metrics, but also a sharee ID and the current timestamp.

The similarity-estimation module 30 in the e-meeting system 3 estimates a similarity level in respect of the image rendered by sharee 2, based on the blurriness metrics from the source device side and sharee side. The similarity-estimation module may also assign a similarity-level class (e.g. "minimum", "medium-", etc.) based on the similarity estimate and one or more threshold values. The similarity-estimation module 30 sends the similarity estimate (and/or similarity-level class) to the source device 1. The information sent from the similarity-estimation module 30 to the source device may include not only the similarity information, but also a sharee ID and a timestamp (which may be the same as the sharee ID and timestamp received from the sharee device 2). The feedback module 18 in the source device 1 generates and displays an indication of the similarity level, e.g. in the form of the feedback 14 described above.

The methods described above are conveniently put into practice as computer-implemented methods. The functional modules described above are conveniently put into practice by appropriate programming of computing apparatus.

The present invention provides a computer program containing instructions which, when executed on computing apparatus, cause the apparatus to perform the method steps implemented by the metric-generation module 24 described above.

The present invention provides a computer program containing instructions which, when executed on computing apparatus, cause the apparatus to perform the method steps implemented by the similarity-estimation module 30 described above.

The present invention provides a computer program containing instructions which, when executed on computing apparatus, cause the apparatus to perform the method steps implemented by the feedback module 18 described above (and/or those implemented by the characterization module 19).

The present invention further provides a non-transitory computer-readable medium storing instructions that, when executed by a computer, cause the computer to perform the method steps implemented by the metric-generation module 24 described above.

The present invention further provides a non-transitory computer-readable medium storing instructions that, when executed by a computer, cause the computer to perform the method steps implemented by the similarity-estimation module 30 described above.

The present invention further provides a non-transitory computer-readable medium storing instructions that, when executed by a computer, cause the computer to perform the method steps implemented by the feedback module 18 described above (and/or those implemented by the characterization module 19).

Figure 13:
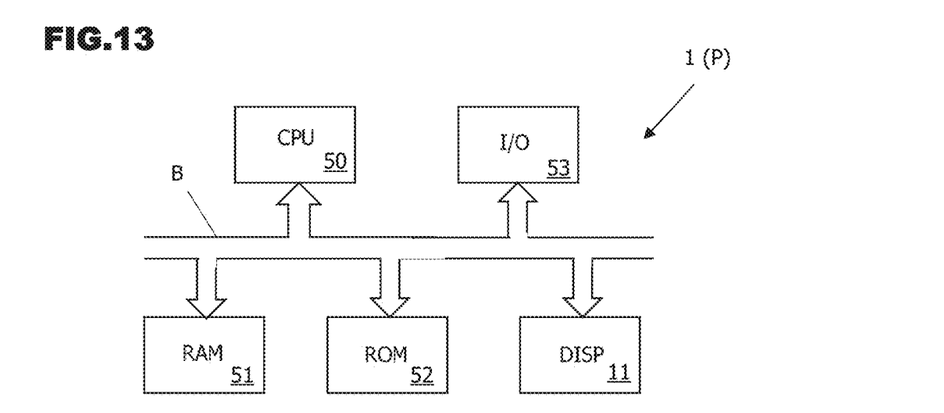
FIG. 13 illustrates components that may be provided in an example source device (or destination device) that may be used in the invention.

As mentioned above, the source device 1 and the destination device 2 can each be constituted by various devices that can be described as computing apparatus. FIG. 13 illustrates typical components that may be provided in such computing apparatus. As illustrated in FIG. 13, the computing apparatus 1 (P) comprises a central processing unit a read-only memory 52 which stores instructions including those necessary to perform the method steps implemented by the feedback module 18 and/or the characterization module 19 (or, in the case of apparatus 2, those of the metric-generation module 24), a random-access memory 51 for holding intermediate computing results, the display 11 (or, in the case of apparatus 2, display 21) and an input/output interface 53. These components may be interconnected by a system bus B.

Although the invention has been described above with reference to certain specific embodiments, it is to be understood that various modifications and adaptations may be made within the scope of the appended claims.

Thus, for example, although an embodiment described above makes use of a CNN algorithm to implement the trained classifier, other classifier architectures may be used in the invention.

Furthermore, besides the techniques described above in relation to so-called "One-Class Classification" (OCC), various known techniques for performing OCC may be employed in the present invention, for example techniques described by Khan S. S., and Madden M. G. (2010) in "A Survey of Recent Trends in One Class Classification", in: Coyle L., Freyne J. (eds) Artificial Intelligence and Cognitive Science. AICS 2009. Lecture Notes in Computer Science, vol 6206. Springer, Berlin, Heidelberg.

It is to be understood that in the present disclosure the expression "source" used in relation to devices distributing content data does not imply that the item of content was generated by the device in question; to the contrary, the device may have acquired the item of content from a different device which generated the content.

The invention claimed is:

1. A computer-implemented method of monitoring, at a source device, a rendering at a destination device of content received by the destination device from the source device, the method comprising:
generating, at the destination device, a metric characterizing the quality of the content rendered at the destination device, said generation of the metric characterizing the quality of the content comprising determining a percentage of source content transmitted by the source device that is rendered at the destination device;
estimating, using said metric, an estimated similarity between the content rendered at the destination device and source content transmitted by the source device, said estimating of the estimated similarity comprising inferring a degree of similarity between the content rendered at the destination device and the source content supplied by the source device based on the quality of the content rendered at the destination device, and
concurrently with the rendering of the content at the destination device, displaying, on a display associated with said source device, an indication of the estimated similarity.

2. The method of claim 1, wherein:
the source content transmitted from the source device to the destination device comprises a source image,
the destination device generates a displayed image based on the received content, and
the generating of said metric characterizing the quality of the content rendered at the destination device comprises:
classifying respective regions of said displayed image into different classes, the classification of each respective region dependent on whether or not said region reproduces image data of the source image, and
assigning, to the quality metric, a value dependent on the number and/or area of any regions classified as reproducing image data of the source image.

3. The method of claim 2, wherein the classifying of respective regions of the displayed image is performed using a one-class support vector machine.

4. The method of claim 1, wherein:
the generating, at the destination device, of said metric characterizing the quality of the content rendered at the destination device comprises generating a feature set describing one or more features of said rendered content,
the estimating of the estimated similarity between the content rendered at the destination device and the source content supplied by the source device comprises:
generating, for the source content, a feature set describing features of the source content corresponding to said one or more features of the rendered content, and
comparing the feature set generated for the content rendered at the destination device with the feature set generated for the source content.

5. The method of claim 4, wherein the generating of said feature set describing one or more features of the content rendered at the destination device comprises quantifying the definition of the rendered content, and the comparing of the feature sets generated for the content rendered at the destination device and for the source content comprises comparing the definition of the content rendered at the destination device with the definition of the source content.

6. The method of claim 4, wherein:
the source content transmitted from the source device to the destination device comprises a source image,
the destination device generates a displayed image based on the received content, and
the comparing of the feature sets generated for the content rendered at the destination device and for the source content comprises dividing each of the source image and the image displayed at the destination device into a set of corresponding regions, and a region by region comparison of the definition of the image displayed at the destination device relative to the definition of the source image.

7. The method of claim 1, wherein the source device performs screen-sharing with a plurality of destination devices, wherein the estimated similarity is estimated between an on-screen image displayed on each respective destination device and an image comprised in the source content, and wherein an indication of each estimated similarity is displayed on a display of the source device.

8. The method of claim 1, wherein the displaying, on the display associated with the source device, of said indication of the estimated similarity comprises classifying the estimated similarity into one of a plurality of classes and displaying a graphical indication of the assigned class.

9. A system configured to monitor, at a source device, rendering at a destination device of content received by the destination device from the source device, the system comprising:
a metric-generation module configured to generate a metric characterizing the quality of the content rendered at the destination device, said generation of the metric characterizing the quality of the content comprising determining a percentage of source content transmitted by the source device that is rendered at the destination device;
a similarity-estimation module configured to estimate, using said metric, an estimated similarity between the content rendered at the destination device and source content transmitted by the source device, said estimating of the estimated similarity comprising inferring a degree of similarity between the content rendered at the destination device and the source content supplied by the source device based on the quality of the content rendered at the destination device, and
a feedback module configured to display, on a display associated with said source device, an indication of the estimated similarity concurrently with the rendering of the content at the destination device.

10. A source computing device configured to monitor rendering at a destination device of content received by the destination device from the source computing device, the source computing device comprising:
a display; and
a feedback module configured to:
receive an estimate of an estimated similarity between the content rendered at the destination device and source content transmitted by the source device, the received estimated similarity having been estimated, using a metric characterizing a quality of the content rendered at the destination device, using an inferred degree of similarity between the content rendered at the destination device and the source content supplied by the source device based on the quality of the content rendered at the destination device, the metric having been generated by determining a percentage of source content transmitted by the source device that is rendered at the destination device, and concurrently with the rendering of the content at the destination device, display, on the display, an indication of the received estimated similarity.

11. The source computing device according to claim 10, further comprising a characterization module configured to generate a set of one or more features characterizing the source content, wherein the feedback module is configured to display an indication of a received similarity estimate signifying the similarity between said set of one or more features characterising the source content and a feature set characterising a corresponding one or more features of corresponding content rendered at the destination device.

12. A non-transitory computer-readable medium comprising instructions which, when executed by a processor of a source computing device, cause the processor to monitor a rendering at a destination device of content received by the destination device from the source computing device by:

receiving an estimate of similarity between the content rendered at the destination device and source content transmitted by the source computing device, the received estimated similarity having been estimated, using a metric characterizing a quality of the content rendered at the destination device, using an inferred degree of similarity between the content rendered at the destination device and the source content supplied by the source device based on the quality of the content rendered at the destination device, the metric having been generated by determining a percentage of source content transmitted by the source device that is rendered at the destination device, generating, for display, an indication of the received similarity estimate, and concurrently with the rendering of the content at the destination device, outputting the generated similarity indication to a display.

* * * * *